US012704485B1

(12) United States Patent
Sadri et al.

(10) Patent No.: US 12,704,485 B1
(45) Date of Patent: Aug. 11, 2026

(54) SYSTEMS, METHODS AND APPARATUS FOR ACOUSTO-ULTRASONIC ASSESSMENT OF METALLURGICAL VESSELS

(71) Applicant: HATCH LTD., Mississauga (CA)

(72) Inventors: Afshin Sadri, Vaughan (CA); Wai Lai Winnie Ying, Oakville (CA); William Watson, Calgary (CA)

(73) Assignee: Hatch Ltd., Mississauga (CA)

( * ) Notice: Subject to any disclaimer, the term of this patent is extended or adjusted under 35 U.S.C. 154(b) by 0 days.

(21) Appl. No.: 19/270,218

(22) Filed: Jul. 15, 2025

(51) Int. Cl.

| | |
|---|---|
| ***G01N 29/46*** | (2006.01) |
| ***G01N 29/07*** | (2006.01) |
| ***G01N 29/12*** | (2006.01) |
| ***G01N 29/24*** | (2006.01) |
| ***G01N 29/44*** | (2006.01) |

(52) U.S. Cl.
CPC ............ *G01N 29/46* (2013.01); *G01N 29/07* (2013.01); *G01N 29/12* (2013.01); *G01N 29/2418* (2013.01); *G01N 29/2437* (2013.01); *G01N 29/4481* (2013.01); *G01N 29/449* (2013.01); *G01N 2291/011* (2013.01); *G01N 2291/017* (2013.01); *G01N 2291/02854* (2013.01); *G01N 2291/106* (2013.01); *G01N 2291/2695* (2013.01)

(58) Field of Classification Search
USPC .......................................................... 702/56
See application file for complete search history.

(56) References Cited

U.S. PATENT DOCUMENTS 4,358,953 A 11/1982 Horiuchi et al.
4,872,345 A 10/1989 Dicks
(Continued)

FOREIGN PATENT DOCUMENTS

CA 2437323 A1 2/2005
CA 2460901 C 4/2014
(Continued)

OTHER PUBLICATIONS

Sadri., et al., "Smelting Furnace Non Destructive Testing (NDT) and Monitoring," 19th World Conference on Non-Destructive Testing 2016, 2016, pp. 1-12.
(Continued)

*Primary Examiner* — Paul D Lee
(74) *Attorney, Agent, or Firm* — Bordner Ladner Gervais LLP; Brandon Evenson

(57) ABSTRACT

Methods and apparatus for inspecting metallurgical furnace walls. A method may comprise receiving a plurality of time domain signals from one or more sensors generated by a reflected stress wave induced by an impactor impacting the metallurgical vessel wall at a predetermined distance from an impact point, converting the plurality of time domain signals into a plurality of frequency domain signals and identifying peaks therein, generating a combined frequency domain signal by cancelling out any peak from one of the plurality of frequency domain signals not having a corresponding peak in at least one other of the plurality of frequency domain signals, and determining at least one of a thickness of the metallurgical vessel wall or an estimated location of a defect in the metallurgical vessel wall based on the combined frequency domain signal.

18 Claims, 9 Drawing Sheets

(56) References Cited

U.S. PATENT DOCUMENTS

| | | | |
|---|---|---|---|
| 5,040,419 A | 8/1991 | Allaire et al. | |
| 5,101,162 A | 3/1992 | Webster et al. | |
| 5,557,631 A | 9/1996 | Bulat et al. | |
| 5,890,805 A | 4/1999 | Groth et al. | |
| 5,944,421 A | 8/1999 | Groth et al. | |
| 6,792,358 B2 | 9/2004 | Rojas et al. | |
| 6,993,977 B2 | 2/2006 | Momayez et al. | |
| 7,174,787 B2 | 2/2007 | Sadri et al. | |
| 7,458,266 B2 | 12/2008 | Beard et al. | |
| 7,555,931 B2 | 7/2009 | Palmer | |
| 7,665,362 B2 | 2/2010 | Sadri | |
| 7,783,436 B2 | 8/2010 | Sadri et al. | |
| 8,919,202 B2 | 12/2014 | Keely et al. | |
| 9,177,371 B2 | 11/2015 | Metala et al. | |
| 9,791,416 B2 | 10/2017 | Gebski et al. | |
| 10,481,131 B2 | 11/2019 | Takahashi | |
| 11,994,495 B2 | 5/2024 | Chandra et al. | |
| 12,085,384 B2 | 9/2024 | Bayram | |
| 2003/0145659 A1 | 8/2003 | Momayez et al. | |
| 2004/0177692 A1 | 9/2004 | Sadri et al. | |
| 2007/0251325 A1* | 11/2007 | King | G01L 11/04 73/702 |
| 2008/0307926 A1 | 12/2008 | Matschullat | |
| 2018/0031718 A1* | 2/2018 | Freitas | G01V 1/44 |
| 2018/0238837 A1* | 8/2018 | Chambers | G01N 29/4454 |
| 2021/0018469 A1 | 1/2021 | Chandra et al. | |
| 2022/0404316 A1 | 12/2022 | Paulino et al. | |
| 2024/0027400 A1 | 1/2024 | Ying et al. | |

FOREIGN PATENT DOCUMENTS

| | | | |
|---|---|---|---|
| CN | 101358843 | B | 8/2012 |
| CN | 110564905 | B | 10/2020 |
| CN | 113514014 | A | 10/2021 |
| DE | 2449707 | A1 | 4/1976 |
| EP | 0335470 | A2 | 10/1989 |
| EP | 1893972 | A1 | 3/2008 |
| JP | H07145410 | A | 6/1995 |
| JP | H10219323 | A | 8/1998 |
| JP | 2001294918 | A | 10/2001 |
| JP | 2013242142 | A | 12/2013 |
| WO | 2021105758 | A1 | 6/2021 |
| WO | 2023249031 | A1 | 12/2023 |
| WO | 2024082068 | A1 | 4/2024 |

OTHER PUBLICATIONS

Sadri., et al., "Monitoring and Control of Refractory Wear for Intensive Operation of Blast Furnace," Novo-Lipetsk Metallurgical Combine, 2016, pp. 191-201.

Sadri., et al., "NDT Techniques for Furnace Refractory Lining Assessment," e-Journal of Nondestructive Testing ISSN 1435-4934, 2024, 14 pages.

Sadri., et al., "New and Innovative Non-Destructive Testing (NDT) Techniques for Inspection and Monitoring of Metal Smelting Furnaces," 2009, 6 pages.

Sadri., et al., "Refractory Wear and Lining Profile Determination in Operating Electric Furnaces Using Stress Wave Non-Destructive Testing (NDT)," The Twelfth International Ferroalloys Congress Sustainable Future, 2010, pp. 881-890.

* cited by examiner

POSITION SENSOR(S) PREDETERMINED DISTANCE FROM IMPACT POINT AT PREDETERMINED HEIGHT

602

GENERATE STRESS WAVE(S) AT IMPACT POINT AND RECEIVE SIGNALS FROM SENSOR(S)

604

DETERMINE QUALITY SCORE FOR EACH SIGNAL

606

QUALITY THRESHOLD MET?

608

NO

REPOSITION SENSORS AROUND NEW IMPACT POINT AT SAME HEIGHT

610

YES

SAVE SIGNALS FOR DETERMINATION OF WALL PROFILE AT CURRENT HEIGHT

612

SYSTEMS, METHODS AND APPARATUS FOR ACOUSTO-ULTRASONIC ASSESSMENT OF METALLURGICAL VESSELS

FIELD

The present disclosure relates to inspection and assessment of structures, such as walls of furnaces and other metallurgical vessels.

BACKGROUND

A typical metallurgical vessel, such as for example a furnace, is a container having sidewalls with a multi-layer construction. The outer layer is typically a steel shell provided for structural support. The inner layer includes a refractory lining, constructed from one or more layers of refractory bricks, that is provided to shield the outer steel shell from molten materials and aggressive chemicals inside the furnace. In some furnaces, a cooling layer is also provided between the outer steel shell and the refractory lining to prevent excessive heat transfer from the refractory lining to the outer steel shell. In some furnace designs, the layers of brick and/or cooling elements are set in place with a soft sand-like material that solidifies during the operation of the furnace.

The refractory lining of a metallurgical vessel deteriorates over time by mechanical and thermal stress in addition to chemical corrosion resulting in a loss of overall refractory lining thickness. As the refractory lining deteriorates molten materials and aggressive chemicals penetrate into widening spaces in and/or between refractory bricks leading to delamination (i.e. separation) of the layers in the refractory lining. Deterioration of the refractory lining ultimately leads to structural failures that may cause the outer steel shell to be exposed to molten materials and aggressive chemicals inside the vessel. Moreover, if the molten materials and aggressive chemicals reach the outer steel shell there is an imminent risk of severe injury to personnel working near the vessel, because the outer steel shell is not capable of reliably holding back the molten materials and aggressive chemicals from inside the vessel. Loss of heat transferability and conductivity are also known to occur as results of the deterioration of the refractory lining.

Another mode of refractory lining deterioration, common in vessels that include water-cooled elements, is hydration of the refractory lining. Under certain temperatures, water that has leaked from a cooling element can react with the refractory bricks causing expedited deterioration of the refractory lining. In particular, magnesium (MgO) based refractory bricks are susceptible to this mode of failure.

It is desirable to regularly check the thickness of the refractory lining, as well as inspect the refractory lining for defects such as cracking, delaminations, accretions and other build-up, and to be able to do so without requiring a costly shutdown of metallurgical operations. One way to inspect a metallurgical vessel such as a furnace while it is operating is to introduce a stress wave into the furnace wall and measure the reflections, as disclosed for example in U.S. Pat. No. 7,665,362, which is hereby incorporated by reference herein.

The inventors have determined a need for improved systems and methods for inspection of metallurgical vessels.

SUMMARY

One aspect of the present disclosure provides a method for inspecting a metallurgical vessel wall, the method comprising: receiving a plurality of time domain signals from one or more sensors, each of the plurality of time domain signals generated by a reflected stress wave induced by an impactor impacting the metallurgical vessel wall at an impact point, wherein each of the plurality of signals is received at a location at a predetermined distance from the impact point; converting the plurality of time domain signals into a plurality of frequency domain signals; identifying peaks in each of the plurality of frequency domain signals; generating a combined frequency domain signal based on the plurality of frequency domain signals by cancelling out any peak from one of the plurality of frequency domain signals not having a corresponding peak in at least one other of the plurality of frequency domain signals; and determining at least one of a thickness of the metallurgical vessel wall or an estimated location of a defect in the metallurgical vessel wall based on the combined frequency domain signal.

In some embodiments, receiving the plurality of time domain signals comprises receiving two or more signals substantially simultaneously from two or more sensors.

In some embodiments, receiving the plurality of time domain signals comprises receiving a first signal from a first sensor at a first time and receiving a second signal from the first sensor at a second time.

In some embodiments, cancelling out any peak from one of the plurality of frequency domain signals not having a corresponding peak in at least one other of the plurality of frequency domain signals comprises cross-correlating at least one of the plurality of frequency domain signals with every other frequency domain signal.

In some embodiments, the method comprises determining an estimated defect location based on differences in frequency and amplitude between corresponding peaks from different ones of the plurality of frequency domain signals.

In some embodiments, the method comprises utilizing a k-means clustering machine learning algorithm to identify one or more clusters of corresponding peaks in the plurality of frequency domain signals.

In some embodiments, the method comprises, for each cluster of corresponding peaks: determining a prominence metric comprising a sum of prominences of the peaks in the cluster; determining a variance metric comprising a sum of absolute values of frequency difference for each peak in the cluster from a center frequency of the cluster; and, determining a ratio of the prominence metric to the variance metric, wherein the ratio of the prominence metric to the variance metric is used to determine a confidence score for a thickness determined based on that cluster of corresponding peaks.

In some embodiments, the method comprises receiving a plurality of time domain signals at each of a plurality of predetermined measurement points, repeating the steps of the method for each of the plurality of predetermined measurement points, and generating an overall wear profile for the metallurgical vessel wall based on the confidence score of the thickness determined for each of the plurality of predetermined measurement points.

In some embodiments, each of the plurality of predetermined measurement points is at a different predetermined height along a sidewall of the metallurgical vessel.

Another aspect of the present disclosure provides an apparatus for inspecting a metallurgical furnace wall, the apparatus comprising: a plurality of sensors configured to detect reflected stress waves in a metallurgical furnace wall; a frame configured to be mounted on the metallurgical furnace wall and hold the plurality of sensors in place against the metallurgical furnace wall arranged around an impact point with each sensor positioned at an equal distance from the impact point; and processing electronics connected to receive the signals from the plurality of sensors and determine at least one of a thickness of the metallurgical furnace wall or an estimated location of a defect in the metallurgical furnace wall based on the signals from the plurality of sensors.

In some embodiments, the apparatus comprises an impactor mounted on the frame, the impactor configured to introduce a stress wave into the metallurgical furnace wall at the impact point.

In some embodiments, the frame is adjustable.

In some embodiments, each of the sensors comprises a piezoelectric sensor.

In some embodiments, each of the sensors comprises a fiber optic sensor.

In some embodiments, each of the sensors comprises a laser-Doppler sensor.

In some embodiments, each of the sensors comprises an accelerometer.

In some embodiments, the processing electronics are configured to: convert a time domain signal from each sensor into a frequency domain signal; identify frequency peaks in each frequency domain signal; and generate a combined frequency domain signal based on the frequency domain signals by cancelling any frequency peaks appearing the frequency domain signal from only one sensor.

In some embodiments, the processing electronics are configured to cancel out any peak from one of the plurality of frequency domain signals not having a corresponding peak in at least one other of the plurality of frequency domain signals comprises cross-correlating at least one of the plurality of frequency domain signals with every other frequency domain signal.

In some embodiments, the processing electronics are configured to determine estimated defect location based on differences in frequency and amplitude between corresponding peaks from different ones of the plurality of frequency domain signals.

In some embodiments, the processing electronics are configured to utilize a k-means clustering machine learning algorithm to identify one or more clusters of corresponding peaks in the plurality of frequency domain signals.

In some embodiments, the processing electronics are configured to, for each cluster of corresponding peaks: determine a prominence metric comprising a sum of prominences of the peaks in the cluster; determine a variance metric comprising a sum of absolute values of frequency difference for each peak in the cluster from a center frequency of the cluster; and, determine a ratio of the prominence metric to the variance metric, wherein the ratio of the prominence metric to the variance metric is used to determine a confidence score for a thickness determined based on that cluster of corresponding peaks.

Another aspect of the present disclosure provides a method for inspecting a metallurgical furnace wall, the method comprising: positioning a plurality of sensors on a metallurgical furnace wall arranged around an impact point, such that each sensor is at an equal distance from the impact point; generating a stress wave in the metallurgical furnace wall at the impact point; receiving a plurality of reflected stress wave signals from the plurality of sensors; processing each of the plurality of reflected stress wave signals to determine a quality score for each reflected stress wave signal; and, when the quality score of one or more of the plurality of reflected stress wave signals does not meet a predetermined quality threshold, prompting a user to reposition the plurality of sensors and repeat the generating, receiving, and processing steps.

In some embodiments, processing each of the plurality of reflected stress wave signals to determine the quality score comprises determining a time domain envelope of the reflected stress wave signal.

In some embodiments, processing each of the plurality of reflected stress wave signals to determine the quality score comprises designating any signal having a sudden peak in the first half of the time domain envelope as a poor quality signal.

In some embodiments, processing each of the plurality of reflected stress wave signals to determine the quality score comprises detecting a sudden peak in a second half of the time domain envelope and trimming the signal after the sudden peak in the second half and zero padding the remainder.

In some embodiments, processing each of the plurality of reflected stress wave signals to determine the quality score comprises determining a decay rate of the reflected stress wave signal, and comparing the determined decay rate to an expected decay rate for an asset class of the metallurgical furnace wall.

In some embodiments, reflected stress wave signals having slower decay rates have higher quality scores than reflected stress wave signals having faster decay rates.

In some embodiments, wherein prompting the user to reposition the plurality of sensors comprises prompting the user to move the plurality of sensors in a direction opposite from a sensor that generated the reflected stress wave signal having a lowest quality score.

In some embodiments, comprising determining an overall quality for the plurality of reflected stress wave signals at a measurement location and prompting the user to repeat the generating, receiving, and processing steps until the overall quality meets predetermined criteria.

In some embodiments, the predetermined criteria comprises a predetermined number of consecutively received reflected stress wave signals meeting the predetermined quality threshold.

Further aspects of the present disclosure and details of example embodiments are set forth below.

DETAILED DESCRIPTION

Figure 1:
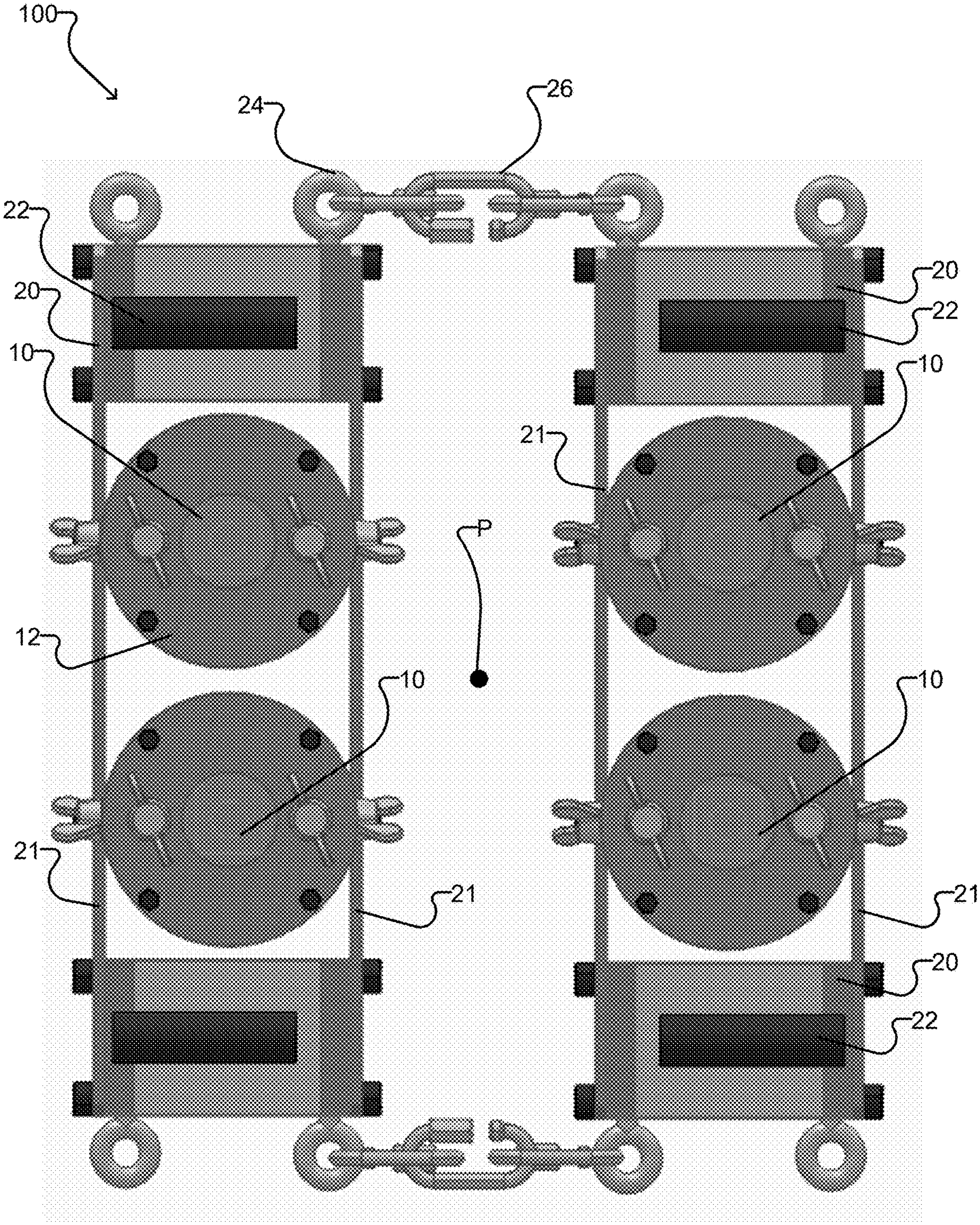
FIG. 1 shows an example system for inspecting a metallurgical vessel wall comprising four sensors according to one embodiment of the present disclosure.

Described herein are example systems, apparatus, and methods for inspection of metallurgical vessels which utilize a technique referred to as the "Acousto Ultrasonic Echo" (AU-E) method to allow vessel walls to be checked during operation, without requiring costly shutdown. As used herein, the term "wall" refers to any exterior surface of a metallurgical vessel, including without limitation, a sidewall, a hearth or floor, a lid, or any other portion of the vessel. Systems according to some embodiments of the present disclosure provide enhanced accuracy in the determination of wall thickness and/or the location of defects in a metallurgical vessel wall by collecting multiple signals equidistant from an impact point and convolving the signals to eliminate spurious peaks as described further below. Methods of processing signals according to some embodiments of the present disclosure improve the signal to noise ratio and also increase the accuracy of multi-layered material calculation.

Some embodiments of the present disclosure provide a system having a plurality of precisely positioned sensors along with real time signal processing software to improve accuracy and anomaly detection of the acousto ultrasonic-echo (AU-E) method. The addition of statistical regression in the automated analysis software assisted in a rapid, accurate condition assessment of multi-layered media. Systems according to some embodiments of the present disclosure are configured for advanced signal quality classification through the combined quantitative convolutional method and the qualitative visual method. Some embodiments provide a system that weights the quality of a signal relative to neighboring measurements when producing a likely refractory profile of the vessel being inspected.

By utilizing multiple sensors in an array, systems and apparatus according to some embodiments of the present disclosure allow for more precise lateral positioning and depth estimation to be made through comparison of frequency responses across the array. This includes both remaining refractory thicknesses, but also anomaly detection and location.

In some embodiments, machine learning enhanced data collection and signal processing software will indicate in real time signal quality to a user inspecting a vessel wall, allowing for precise adjustments and repositioning of the sensor array to ensure that high quality data is collected. In some embodiments, test results may be verified by a human user and added to the historical database to further train machine learning models. This continual training will refine the model parameters and increase confidence over time.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows an example inspection system 100 according to one embodiment of the present disclosure. The system 100 comprises a plurality of sensors 10 that are held in place against a metallurgical vessel wall by a frame assembly with the sensors 10 arranges such that each sensor 10 is the same distance from an impact point P. The sensors 10 are operatively coupled to processing electronics and configured to detect reflections of a stress wave introduced into the wall at the impact point P. The sensors 10 generate signals based on the detected reflections and provide time domain signals to the processing electronics for further processing as described below. In some embodiments, the sensors 10 comprise fiber optic sensors. In some embodiments, the sensors 10 comprises piezoelectric transducers. In some embodiments, the sensors 10 comprise laser-Doppler transducers. In some embodiments, the sensors 10 comprise accelerometer transducers.

Figure 8:
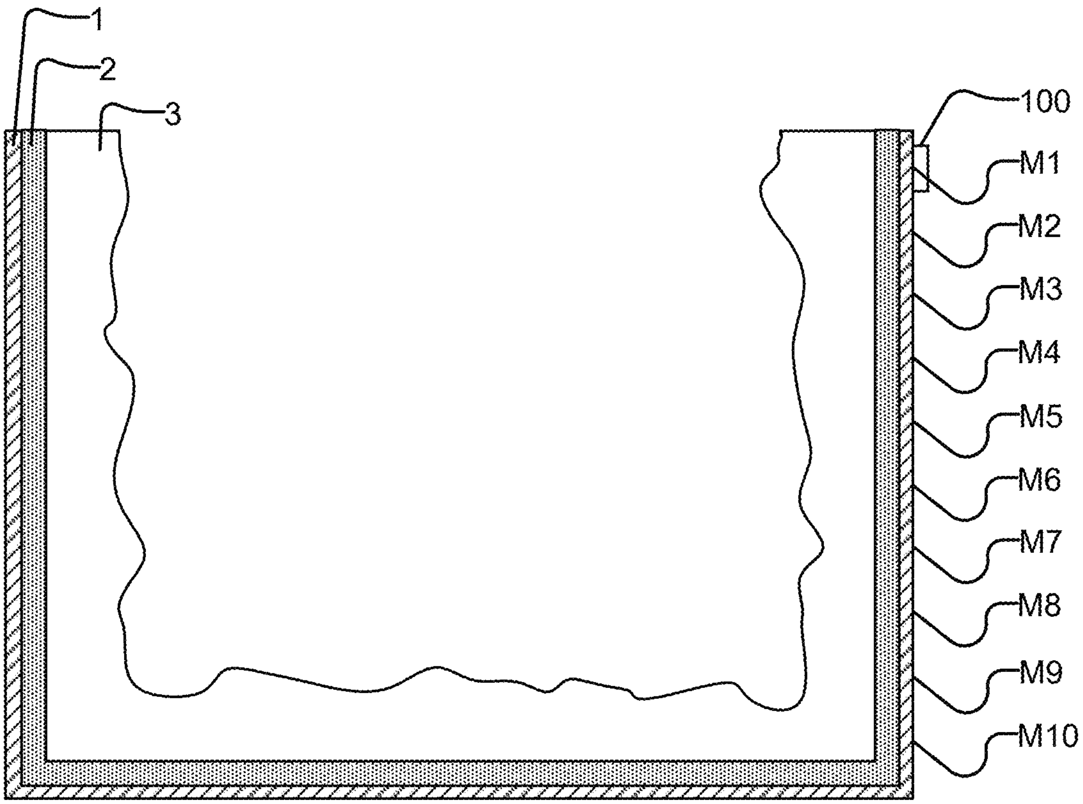
FIG. 8 schematically illustrates a metallurgical vessel wall being inspected by a sensor system at a plurality of measurement points according to an example embodiment of the present disclosure.

In operation, the system 100 may be utilized to inspect the walls of a metallurgical vessel while the vessel is in use. FIG. 8 schematically illustrates an example metallurgical vessel having a wall with an exterior layer 1, an intermediate layer 2, and an inner layer 3. The inspection system 100 may be readily mounted at any point on the exterior layer 1 of the vessel, and operated to collect a plurality of signals at a measurement point to detect the overall wall thickness, the inner and outer surfaces of layers 1-3, and any defects (e.g. cracks of other anomalies) therein. In some embodiments, the system may be moved to collect signals at a plurality of measurement points to determine an overall vessel wall wear profile. The example illustrated in FIG. 8 shows ten measurement points M1-M10 along one of the sidewalls of the vessel, but any number of measurement points may be used, along any or all of the walls of the vessel. The number and locations of measurement points may be selected by the operator depending on the type of vessel under inspection, and the amount and nature of use since the last inspection.

In the FIG. 1 example, the system 100 comprises four sensors 10. Each sensor 10 has an associated sensor housing 12, which is coupled to the frame assembly to hold the sensor 10 in place. The frame assembly comprises two frame members, each frame member comprising a pair of mounting plates 20 having a pair of side rails 21 extending therebetween, with two sensors 10 and their associated housings 12 held between the rails 21. The mounting plates 20 have magnets 22 thereon, such that the frame assembly can be readily mounted on the exterior layer 1 of a metallurgical vessel wall (which is typically constructed from steel), and the system 100. The mounting plates 20 also have eyelets 24 extending therefrom, which facilitate coupling the two frame members together by a connecting member, such as for example by a chain connector 26. In some embodiments, the positions of the sensor housings 12 along the side rails 21 is adjustable, as is the connecting member between the frame members, such that the distance between the sensors 10 and the impact point can be adjusted by a user.

Figure 1A:
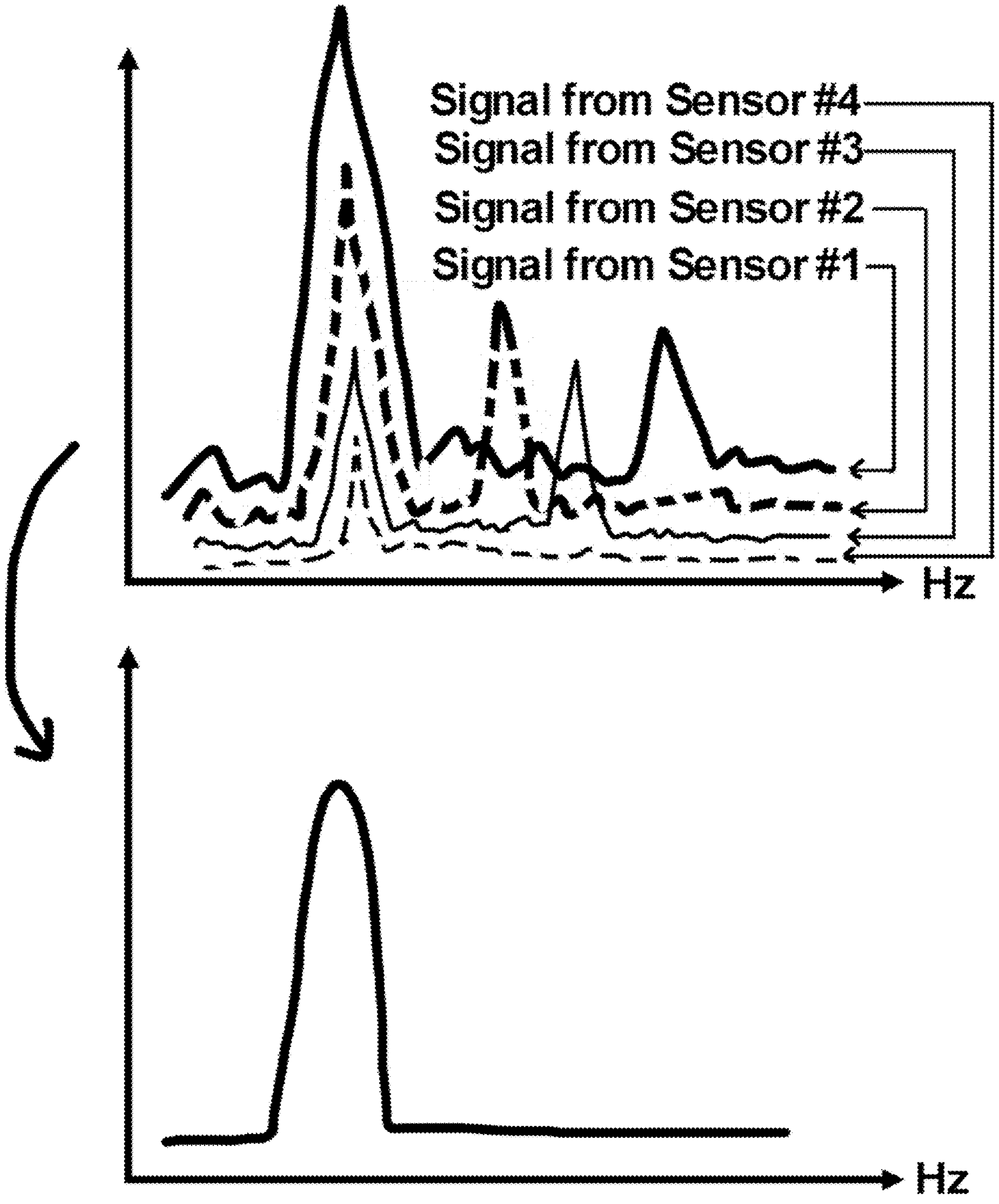
FIG. 1A schematically illustrates frequency domain signals from the sensors of FIG. 1 (top graph), and a resulting combined frequency domain signal (bottom graph) generated by a method according to one embodiment of the present disclosure.

As discussed further below with reference to FIG. 5, the sensors 10 generate time domain signals which are provided to one or more processors of the processing electronics for conversion into the frequency domain and generation of a combined signal, which facilitates more accurate determination of wall thickness and/or defect location. The top graph of FIG. 1A schematically illustrates simulated example frequency domain signals generated from time domain signals received from the sensors of FIG. 1. The bottom graph of FIG. 1A shows a simulated example resulting combined frequency domain signal generated by the processing electronics, in which peaks appearing in only one of the signals are removed. In some embodiments, the processing electronics may comprise one or more dataloggers for receiving the time domain signals from the sensors 10, and/or one or more preamps for amplifying the time domain signals. In some embodiments, the time domain signals from the sensors 10 are processed by the processing electronics to determine quality scores in real time, and the system 100 is configured to provide feedback to a user conducting an inspection indicating low quality signals, such that the user can reposition the sensors 10 to obtain higher quality signals, as described further below with reference to FIG. 6.

Figure 2:
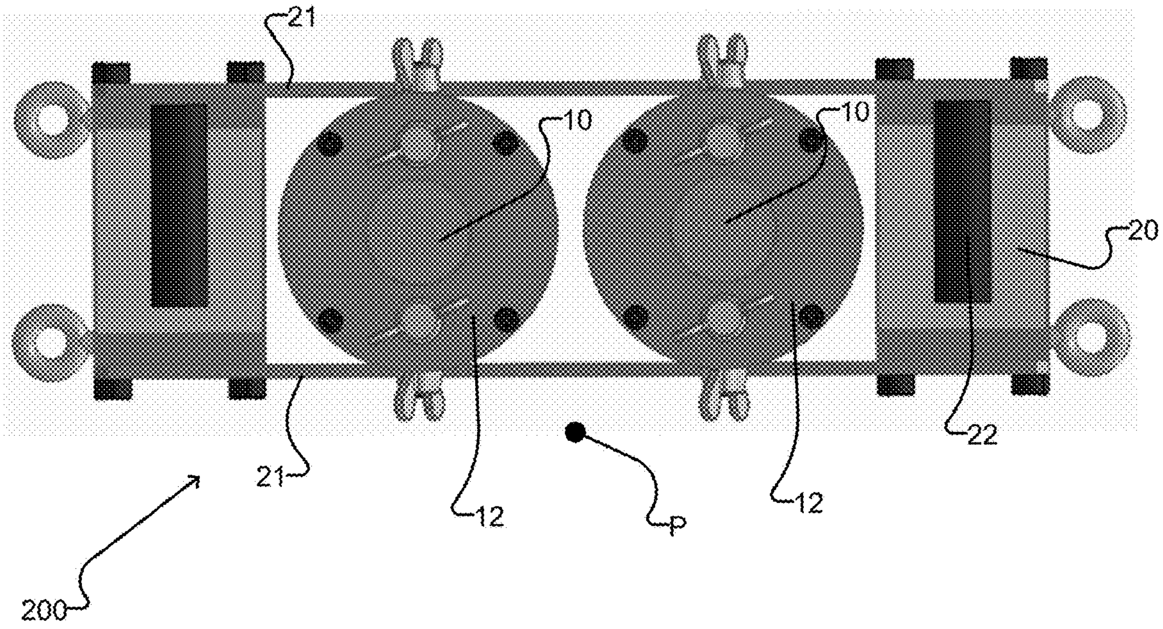
FIG. 2 shows an example system for inspecting a metallurgical vessel wall comprising two sensors according to another embodiment of the present disclosure.
Figure 2A:
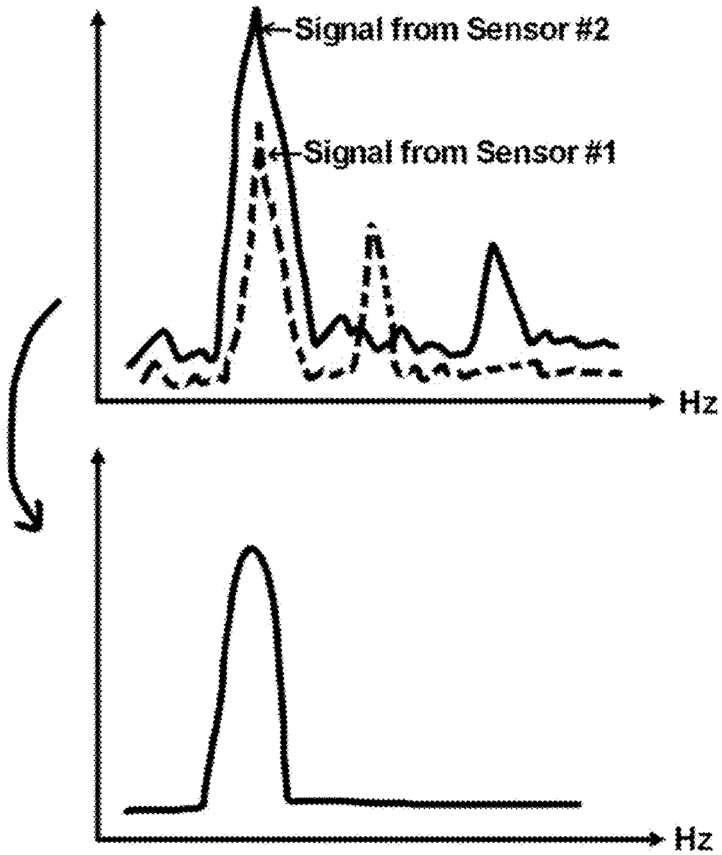
FIG. 2A schematically illustrates frequency domain signals from the sensors of FIG. 2 (top graph), and a resulting combined frequency domain signal (bottom graph) generated by a method according to another embodiment of the present disclosure.

The example system 100 of FIG. 1 utilizes four sensors 10, but it is to be understood that systems according to other embodiments of the invention could have different numbers of sensors. For example, FIG. 2 shows an example system 200 for inspecting a metallurgical vessel wall comprising two sensors 10 held in place by a signal frame member (which is substantially the same as one of the frame members of the FIG. 1 example and will not be described again), and FIG. 2A schematically illustrates simulated example frequency domain signals (top graph) generated from time domain signals received from the sensors of FIG. 2, and a simulated example resulting combined frequency domain signal (bottom graph) generated by the processing electronics.

Figure 3:
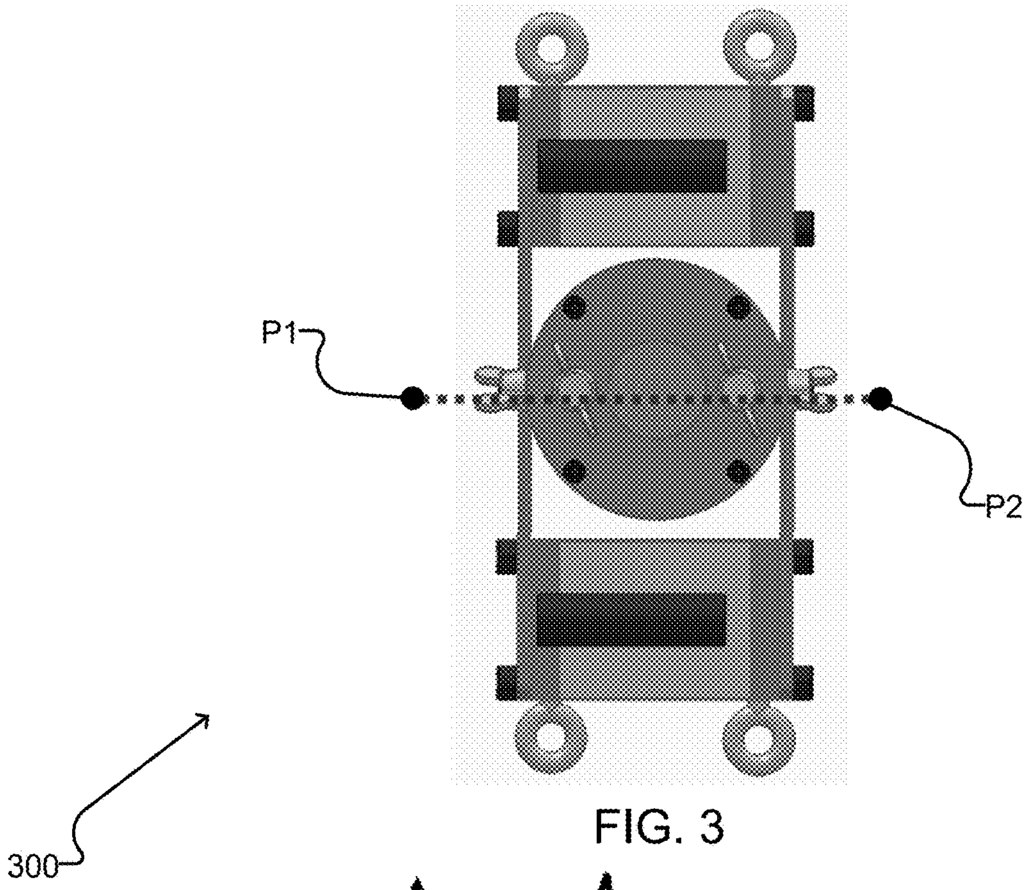
FIG. 3 shows an example system for inspecting a metallurgical vessel wall comprising a single sensor according to another embodiment of the present disclosure.
Figure 3A:
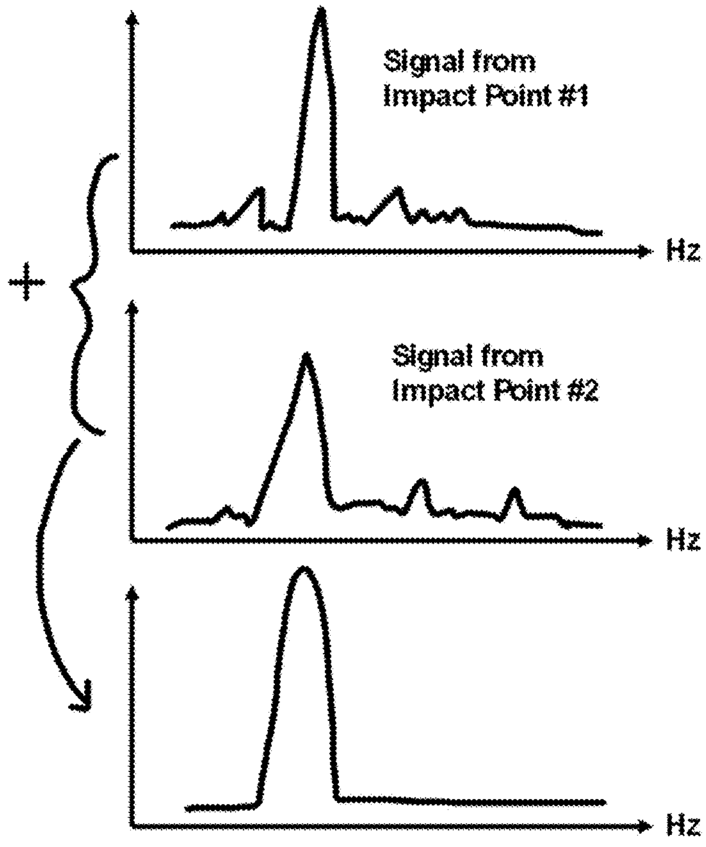
FIG. 3A schematically illustrates frequency domain signals from the sensor of FIG. 3 from a stress wave generated at a first impact point (top graph), a stress wave generated at a second impact point (middle graph), and a resulting combined frequency domain signal (bottom graph) generated by a method according to another embodiment of the present disclosure.

In some embodiments, multiple signals from a single sensor may be collected and analyzed according to the methods disclosed herein to more accurately and reliably detect wall thicknesses and defects. For example, FIG. 3 shows an example system 300 for inspecting a metallurgical vessel wall comprising a single sensor, which may be utilized to detect reflections generated from stress waves at a first impact point P1 and a second impact point P2, both the same distance from the sensor. In some embodiments, the impact points P1 and P2 are also at the same height along a sidewall of the vessel. Due to the fact that metallurgical operations often cause different amounts of wear at different heights (e.g. due to typical fill levels of molten metals within the vessel), collecting and combining multiple signals from stress waves generated at the same height can provide a more accurate and reliable determination of wall thickness/wear conditions. FIG. 3A shows simulated example frequency domain signals generated from time domain signals received from the sensor of FIG. 3 from stress waves generated at the first and second impact points (top and middle graphs), and a simulated example resulting combined frequency domain signal (bottom graph) generated by the processing electronics.

Figure 4:
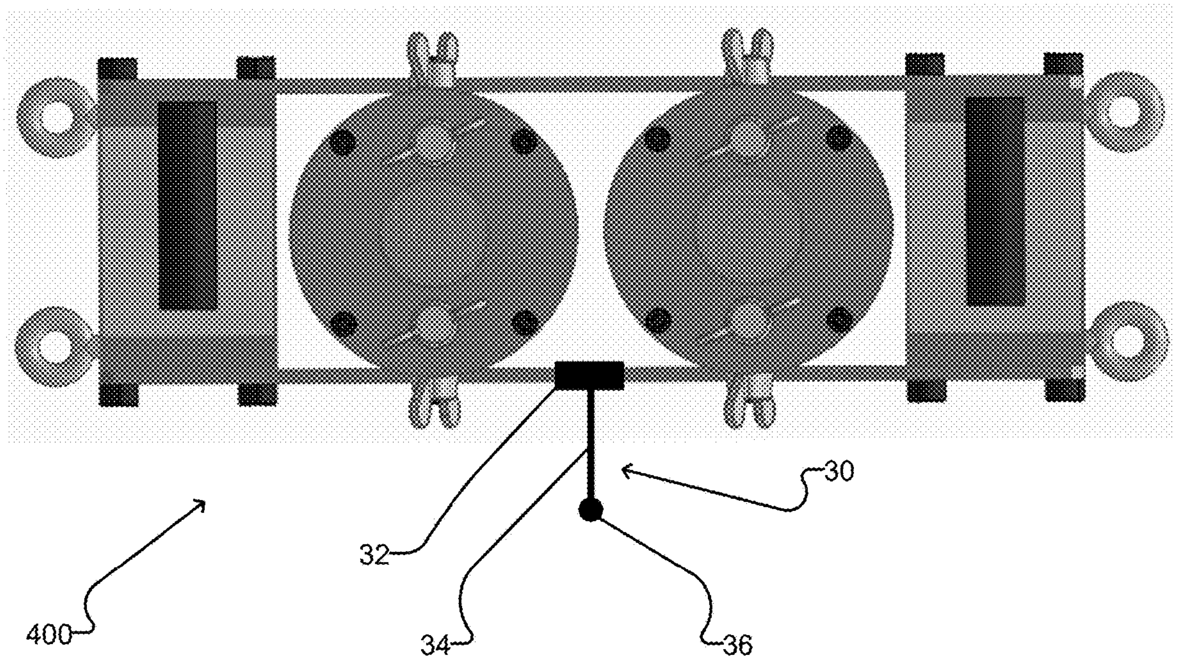
FIG. 4 shows an example system for inspecting a metallurgical vessel wall comprising two sensors and an impactor according to another embodiment of the present disclosure.

Some embodiments provide an inspection system with one or more impactors integrated therein and configured to generate a stress wave in a vessel wall at a predetermined distance from the sensor(s) of the system. For example, FIG. 4 shows an example system 400 for inspecting a metallurgical vessel wall which is substantially the same as system 200 of FIG. 2, except that system 400 includes an impactor 30. In the illustrated example, the impactor 30 comprises an actuator 32 mounted on one of the side rails 21 of the frame member, with a rod 34 extending therefrom having a steel ball 36 at the end thereof. In some embodiments, the actuator 32 may be operatively coupled to the processing electronics, such that the processing electronic can activate the impactor 30 to cause the steel ball 36 to strike the vessel wall to introduce a stress wave. Such an impactor 30 could similarly be integrated into system 100 of FIG. 1, system 300 of FIG. 3, or other inspection systems. Also, different configurations of impactor may be integrated into inspection system in other embodiments.

Figure 5:
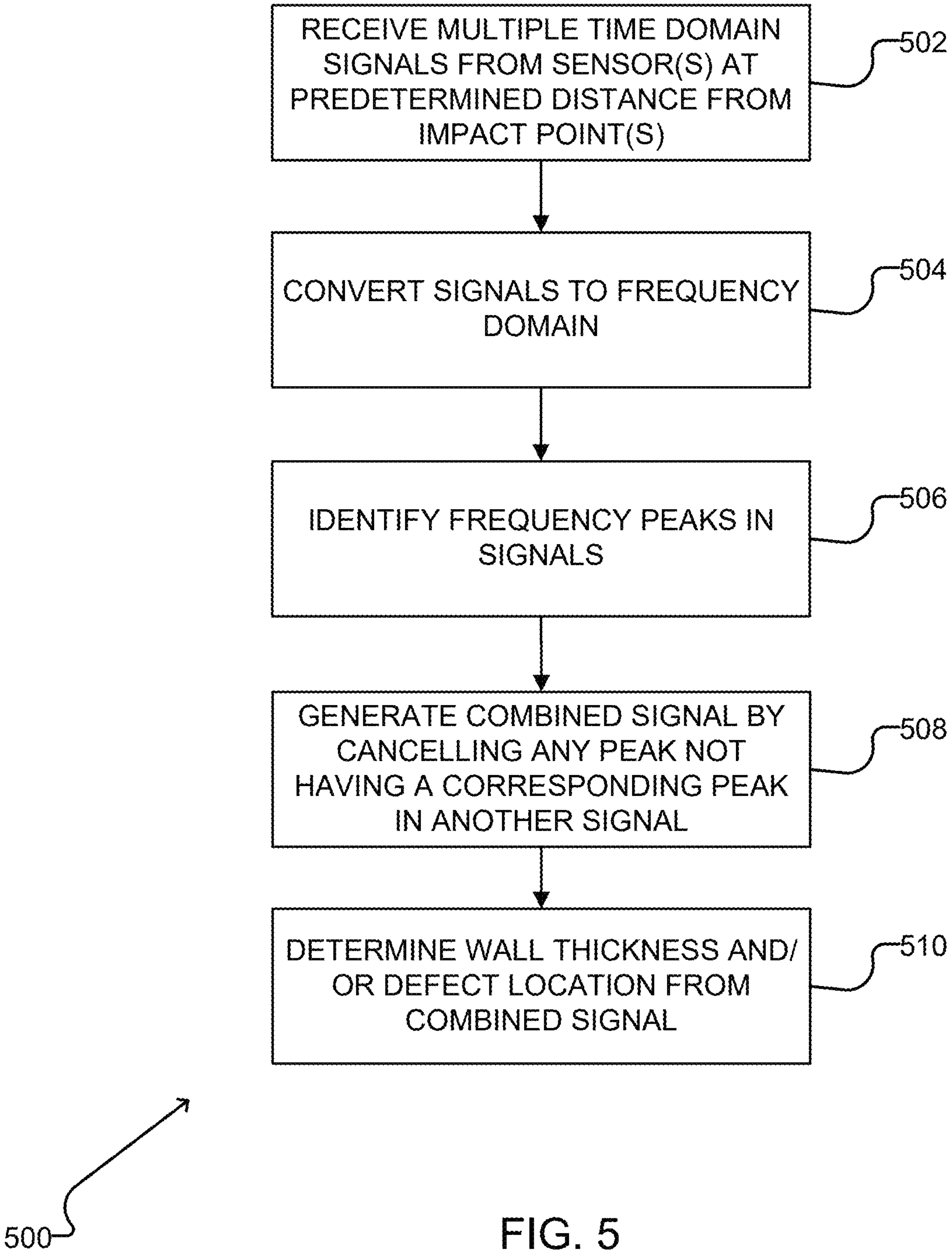
FIG. 5 is a flowchart showing steps of an example method for inspecting a metallurgical vessel wall according to one embodiment of the present disclosure.

FIG. 5 is a flowchart showing steps of an example method 500 for inspecting a metallurgical vessel wall according to one embodiment of the present disclosure. The method 500 may, for example, be carried out by one or more processors of the processing electronics of any of systems 100, 200, 300 or 400 described above. At step 502, the processor receives a plurality of time domain signals from one or more sensors at a predetermined distance from one or more impact points. At step 504, the processor converts the time domain signals into frequency domain signals, for example by performing a fast Fourier transform (FFT) on each time domain signal. At step 506, the processor identifies frequency peaks in the frequency domain signals. Identifying the peaks may, for example, comprise applying a peak finding algorithm to each frequency domain signal. In some embodiments, the processor normalizes the amplitude and applies smoothing to the frequency domain signals to improve peak detection of relevant peaks.

At step 508, the processor generates a combined signal by cancelling out any peak from one of the plurality of frequency domain signals not having a corresponding peak in at least one other of the plurality of frequency domain signals. If a peak at a particular frequency appears in only one of the signals, it is likely that such peak is not caused by a surface of the wall material or a defect in the wall material, but rather caused by artefacts such as impact noise or reverberations. In some embodiments, cancelling out such peaks comprises cross-correlating at least one of the plurality of frequency domain signals with every other frequency domain signal.

At step 510, the processor determines a wall thickness and/or a defect location based on the combined signal. Utilizing the combined signal allows for improved determination of wall thickness and/or location defects since spurious peaks have been removed.

In some embodiments, the method 500 also comprises generating a Power Spectral Density (PSD) spectrogram for the combined signal and/or each frequency domain signal, and determining a defect location at step 510 also comprises determining a defect location based on the spectrograms. A PSD spectrogram is a visualization of the PSD, showing the frequency content as a function of time (for example, a 2D heat map, with frequency and time on the axes, and energy/amplitude as the color temperature. Valid (quality) peaks for detecting thickness or cracks (anomalies) can be assessed in the spectrogram based on the frequency band width, the time duration, and amplitude decay. Furthermore, slight differences in frequency and amplitude across signals for the same measurement point can indicate the relative distance from each sensor to the source of the reflection (e.g., crack). Longer distance will result in slightly lower frequency and slightly lower amplitude.

In some embodiments, the method 500 comprises filtering the combined signal and/or each frequency domain signal to remove noise. For example, high amplitude “bright spots” appearing in a PSD spectrogram in very early time are indicative of impact related noise, and long-lasting frequency bands are related to reverberation noise. In some embodiments, computer vision algorithms are utilized to detect, classify and remove these sources of noise prior to determining a wall thickness and/or a defect location.

In some embodiments, the method 500 comprises utilizing machine learning (ML) clustering to improve signal quality and determine a confidence score for each frequency peak. For example, in some embodiments the processor calculates and stores a prominence for each peak identified in the plurality of frequency domain signals. Note that prominence is the vertical difference between the peak height and its lowest contour line. In some embodiments, the processor plots all peaks from all frequency domain signals (Prominence vs Frequency), and utilizes a k-means clustering ML algorithm to identify groupings of peaks (these will be candidates for valid peaks). The k means algorithm also returns a value that is the cluster center (the center of gravity, so to speak). For each cluster identified:

If there is only one element in the cluster, reject it.

Compute the sum of the prominences.

Compute the sum of the absolute value of the distance in frequency of each peak from the cluster center. This is a metric of the frequency variance for the cluster.

Calculate the ratio of the prominence to variance for each cluster. This value is the confidence score for the corresponding peak in the combined signal.

Normalize these confidence scores to between zero and one for the entire dataset, where one is the highest prominence and lowest variance.

In some embodiments, the processor utilizes the confidence scores as weights in determining the overall asset wear profile. In some embodiments, the processor is configured to determine a wall profile line along a vertical section of a vessel sidewall based on combined signals generated at a plurality of measurement points at predetermined heights. In some embodiments, the processor is configured to determine a wall profile line along a horizontal section of a vessel hearth wall based on combined signals generated at a plurality of measurement points at predetermined locations across the hearth wall. The highest confidence score peaks are used as anchors in fitting a wall profile line to the measurement data where the wall profile line is forced to cross, lower confidence score peaks have less pull on the wall profile line.

Figure 6:
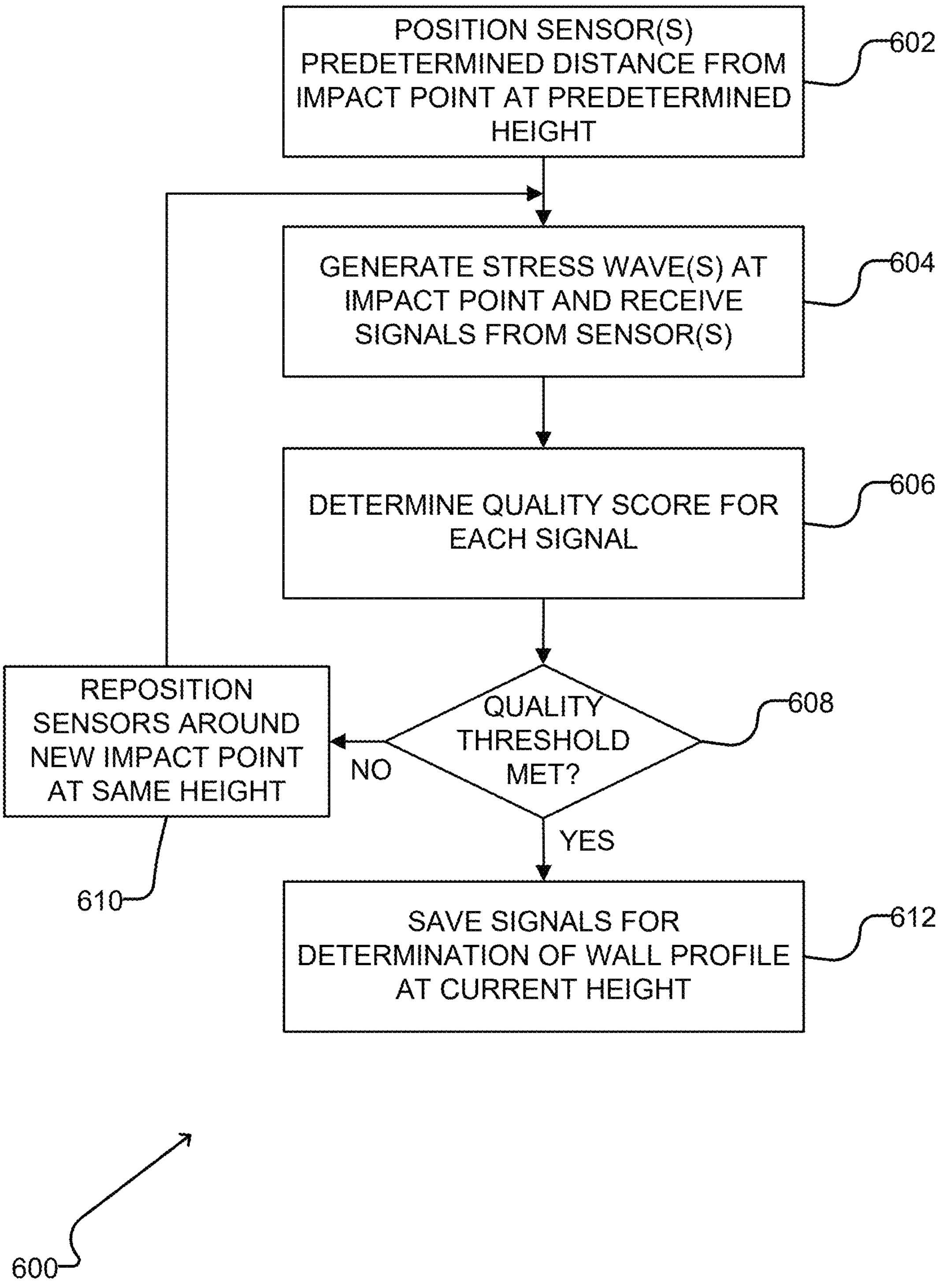
FIG. 6 is a flowchart showing steps of an example method for inspecting a metallurgical vessel wall according to another embodiment of the present disclosure.

FIG. 6 is a flowchart showing steps of an example method 600 for inspecting a metallurgical vessel wall according to one embodiment of the present disclosure. The method 600 may, for example, be carried out by a technician utilizing any of systems 100, 200, 300 or 400 described above to inspect the vessel wall. At step 602, the user positions the sensors at a predetermined distance from an impact point at a predetermined height on the metallurgical vessel wall (or in case of the system 300 of FIG. 3, positions the sensor at the predetermined height and identifies the impact points at a predetermined distance from the sensor). At step 604, the user generates a stress wave at the impact point(s) (e.g. by activating an impactor integrated into the system, or striking the wall with a ball peen hammer or other suitable tool), and the processing electronics of the system receives a plurality time domain signals from the sensor(s). In some embodiments, step 604 may comprise introducing multiple stress waves into the vessel wall at the impact points(s), and receiving multiple sets of time domain signals.

At step 606, the processor determines a quality score for each time domain signal. In some embodiments, determining the quality score may comprise characterizing the time domain signal by measuring the envelope of the TD signal, and: if a sudden spike in the envelope exists in the first half of the signal, the signal is rejected (e.g. receives a quality score of zero); and if sudden spike in the envelope exists in the second half of the signal, trim the signal at that point, zero-pad the signal for the remainder. In some embodiments, determining the quality score may comprise determining the decay rate of the time domain signal by measuring the coefficients of the time domain signal envelope exponential decay curve to determine the quality factor or Q factor according to the following equation:

$$A(t) = A(0)e\left(-\frac{\pi f_n t}{Q}\right)$$

wherein:

$A(0)$ is the initial amplitude of the time domain signal envelope;

$A(t)$ is the amplitude of the time domain signal envelope at time t;

$f_n$ is the primary natural frequency of the time domain signal; and the Quality Factor, $Q \approx 4.53N$, where N=Number of cycles of the time domain signal until $A(t)$ is 50% of $A(0)$.

In some embodiments, determining the quality score may comprise computing the time domain signal envelope decay curve through peak finding algorithms according to the ring-down method, and from the ring-down method fitting the quality factor and signal error from an ideal curve is computed. In some embodiments, signal error is computed as the R-squared ($R^2$) goodness of fit from the ring-down fitting algorithm:

$$R^2 = \frac{SSR}{SST} = \frac{\text{Sum of Squares Regression}}{\text{Sum of Squares Total}} = \frac{\sum_{i=1}^{n} (\hat{y}_i - y_i)^2}{\sum_{i=1}^{n} (y_i - \overline{y})^2}$$

In some embodiments, the $R^2$ goodness of fit is compared to a predefined fit threshold. If the $R^2$ is below the fit threshold cutoff the signal is marked as poor quality.

In some embodiments the computed quality factor Q is compared against an acceptable range of quality factors. This range of quality factors is determined through a combination of modelling the refractory lining material properties and historical data in the context of the inspection (e.g., blast furnace w/staves, stoves, vessels, tanks, electric furnace with plate coolers, hearth or sidewall locations). Note that given thicknesses, geometries, and materials used in construction of the vessel wall, the value range of acceptable quality factors will be custom to the asset class.

In some embodiments, the Q factor for each time domain signal is converted into a quality score determined relative to an acceptable range of Q factors. This is based on the understanding that slow decay rates (high Q factors) indicate high levels of surface reverberation (i.e., noise). The quality score is a value between zero and one, where 1 is the high end of the range (decays the slowest) and 0 is the low end of the range (decays the fastest).

As signals are collected at the measurement point good and poor-quality signals are counted, and at step 608 the processor determines if a quality threshold has been met by the signals for that measurement point. If not (step 608 NO output), the system prompts the user to reposition the sensor(s) in relation to a new impact point at the same height along the vessel wall at step 610, and steps 604, 606 and 608 are repeated until the quality threshold is met. Once the quality threshold is met (step 608 YES output), the method 600 proceeds to step 612 the system saves the signals for determination of a wall profile at the current height. The example method 600 of FIG. 6 is described with reference to inspection of a vessel sidewall by taking measurements at various heights, but it is to be understood that the method 600 could also be performed to determine a wall profile of a vessel hearth or floor by taking measurements at various horizontal locations along the bottom of the hearth or floor. Determination of the wall profile may, for example, comprise determining a wall thickness and/or defect location as described above.

In some embodiments, the quality threshold may require that all signals have at least a minimum quality score, in which case when any poor quality signal is received the system prompts the user to reposition the sensor(s). In some embodiments, if multiple poor-quality signals are received in a row (e.g. 3) the system prompts the user to adjust the sensor positioning, and if poor quality signals are repeatably detected after adjusting the sensor positioning (e.g. 3 adjustments) the system may warn the user of detection issues with the measurement location. In some embodiments, a predefined number of good quality signals are required before meeting the quality threshold for a given measurement point (e.g. 10 signals). This value can be adjusted by the user based on experience and site conditions.

Figure 7:
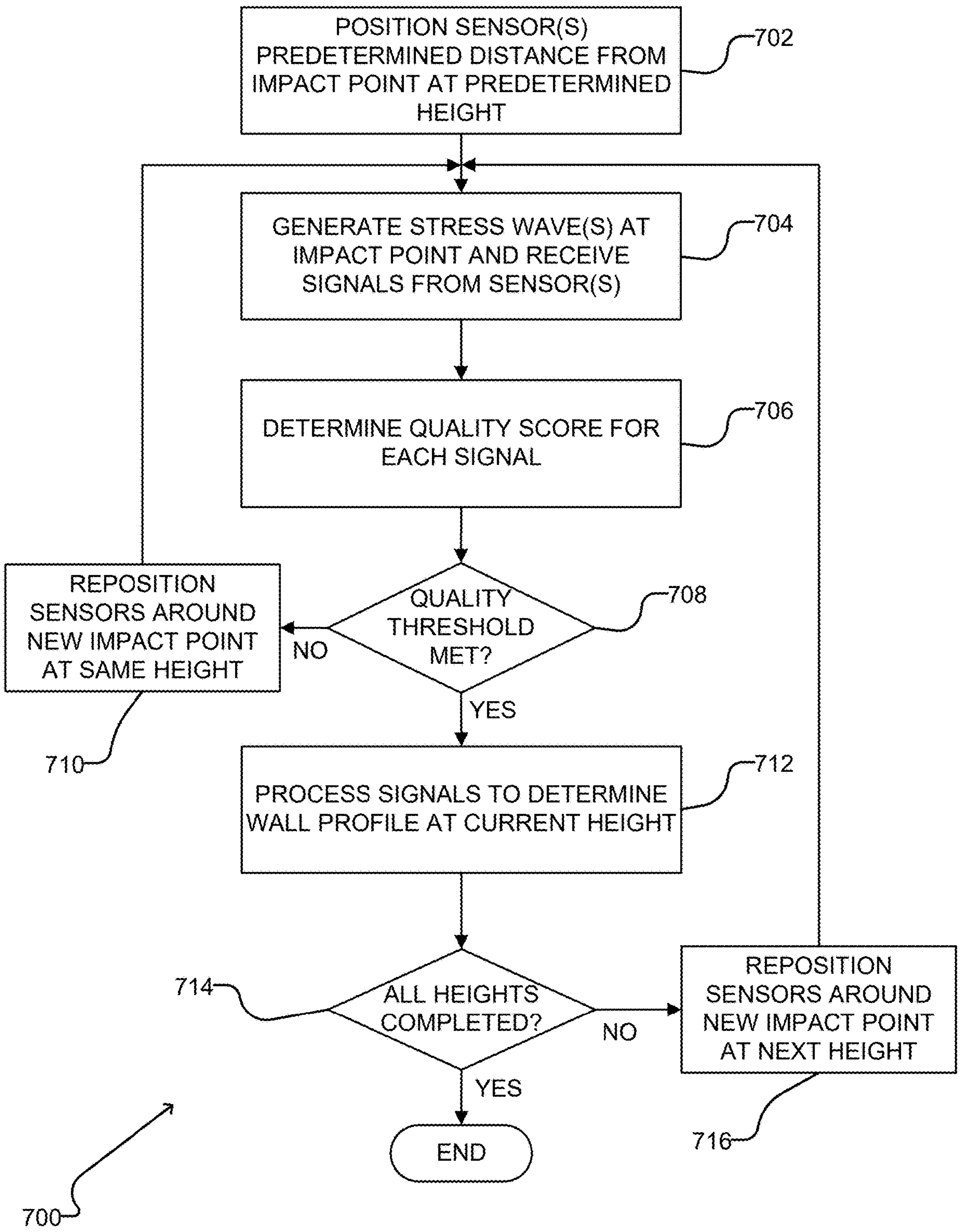
FIG. 7 is a flowchart showing steps of an example method for inspecting a metallurgical vessel wall according to another embodiment of the present disclosure.

FIG. 7 is a flowchart showing steps of an example method 700 for inspecting a metallurgical vessel wall according to one embodiment of the present disclosure. Steps 702 through 710 of method 700 are the same as steps 602 through 610 of method 600 of FIG. 6 described above and will not be described again. In method 700, once the quality threshold is met (step 708 YES output), at step 712 the processor processes the time domain signals to determine a wall profile at the current height (e.g. by determining wall thickness and/or defect location as described above), and then at step 714 the processor checks whether wall profiles have been determined for all or a predetermined number of measurement points at different heights along the vessel wall (e.g. measurement points M1-M10 of FIG. 8). If wall profiles have not been determined for all heights (step 714 NO outout), the method prompts the user to move the sensor(s) to be a predetermined distance from a new impact point at a next one of the heights, and steps 704 through 712 are repeated for the new height. Once wall profiles have been determined for all heights (step 714 YES output), the system outputs a final overall asset wall profile generated based on the wall profiles determined at each of the measurement points, and the method 700 is complete.

As will be apparent to those skilled in the art in light of the foregoing disclosure, many alterations and modifications are possible to the systems, apparatus and methods described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

What is claimed is:

1. A method for inspecting a metallurgical vessel wall, the method comprising:

receiving a plurality of time domain signals from one or more sensors, each of the plurality of time domain signals generated by a reflected stress wave induced by an impactor impacting the metallurgical vessel wall at an impact point, wherein each of the plurality of signals is received at a location at a predetermined distance from the impact point;

converting the plurality of time domain signals into a plurality of frequency domain signals;

identifying peaks in each of the plurality of frequency domain signals;

generating a combined frequency domain signal based on the plurality of frequency domain signals by cancelling out any peak from one of the plurality of frequency domain signals not having a corresponding peak in at least one other of the plurality of frequency domain signals; and determining at least one of a thickness of the metallurgical vessel wall or an estimated location of a defect in the metallurgical vessel wall based on the combined frequency domain signal.

2. The method of claim 1 wherein receiving the plurality of time domain signals comprises receiving two or more signals substantially simultaneously from two or more sensors.

3. The method of claim 1 wherein receiving the plurality of time domain signals comprises receiving a first signal from a first sensor at a first time and receiving a second signal from the first sensor at a second time.

4. The method of claim 1 wherein cancelling out any peak from one of the plurality of frequency domain signals not having a corresponding peak in at least one other of the plurality of frequency domain signals comprises cross-correlating at least one of the plurality of frequency domain signals with every other frequency domain signal.

5. The method of claim 1 comprising determining an estimated defect location based on differences in frequency and amplitude between corresponding peaks from different ones of the plurality of frequency domain signals.

6. The method of claim 1 comprising utilizing a k-means clustering machine learning algorithm to identify one or more clusters of corresponding peaks in the plurality of frequency domain signals.

7. A method for inspecting a metallurgical vessel wall, the method comprising:

a. receiving a plurality of time domain signals from one or more sensors, each of the plurality of time domain signals generated by a reflected stress wave induced by an impactor impacting the metallurgical vessel wall at an impact point, wherein each of the plurality of signals is received at a location at a predetermined distance from the impact point;

b. converting the plurality of time domain signals into a plurality of frequency domain signals;

c. identifying peaks in each of the plurality of frequency domain signals;

d. generating a combined frequency domain signal based on the plurality of frequency domain signals by cancelling out any peak from one of the plurality of frequency domain signals not having a corresponding peak in at least one other of the plurality of frequency domain signals; and e. determining at least one of a thickness of the metallurgical vessel wall or an estimated location of a defect in the metallurgical vessel wall based on the combined frequency domain signal, the method further comprising utilizing a k-means clustering machine learning algorithm to identify one or more clusters of corresponding peaks in the plurality of frequency domain signals and, for each cluster of corresponding peaks:

determining a prominence metric comprising a sum of prominences of the peaks in the cluster;

determining a variance metric comprising a sum of absolute values of frequency difference for each peak in the cluster from a center frequency of the cluster; and, determining a ratio of the prominence metric to the variance metric, wherein the ratio of the prominence metric to the variance metric is used to determine a confidence score for a thickness determined based on that cluster of corresponding peaks.

8. The method of claim 7 further comprising receiving a plurality of time domain signals at each of a plurality of predetermined measurement points, repeating the steps of the method for each of the plurality of predetermined measurement points, and generating an overall wear profile for the metallurgical vessel wall based on the confidence score of the thickness determined for each of the plurality of predetermined measurement points.

9. The method of claim 8 wherein each of the plurality of predetermined measurement points is at a different predetermined height along a sidewall of the metallurgical vessel.

10. An apparatus for inspecting a metallurgical vessel wall, the apparatus comprising:

one or more sensors configured to detect reflected stress waves in a metallurgical vessel wall and generate a plurality of time domain signals, each of the plurality of time domain signals generated by a reflected stress wave induced by an impactor impacting the metallurgical vessel wall at an impact point, wherein each of the plurality of signals is received at a location at the same predetermined distance from the impact point; and processing electronics configured to:

receive the plurality of time domain signals from the one or more of sensors;

convert the plurality of time domain signals into a plurality of frequency domain signals;

identify frequency peaks in each of the plurality of frequency domain signals;

generate a combined frequency domain signal based on the frequency domain signals by cancelling out any peak from one of the plurality of frequency domain signals not having a corresponding peak in at least one other of the plurality of frequency domain signals; and determine at least one of a thickness of the metallurgical vessel wall or an estimated location of a defect in the metallurgical vessel wall based on the combined frequency domain signal.

11. The apparatus of claim 10, wherein each of the sensors comprises a piezoelectric sensor.

12. The apparatus of claim 10, wherein each of the sensors comprises a fiber optic sensor.

13. The apparatus of claim 10, wherein each of the sensors comprises a laser-Doppler sensor.

14. The apparatus of claim 10, wherein each of the sensors comprises an accelerometer.

15. The apparatus of claim 10, wherein the processing electronics are configured to cancel out any peak from one of the plurality of frequency domain signals not having a corresponding peak in at least one other of the plurality of frequency domain signals by cross-correlating at least one of the plurality of frequency domain signals with every other frequency domain signal.

16. The apparatus of claim 10, wherein the processing electronics are configured to determine estimated defect location based on differences in frequency and amplitude between corresponding peaks from different ones of the plurality of frequency domain signals.

17. The apparatus of claim 10, wherein the processing electronics are configured to utilize a k-means clustering machine learning algorithm to identify one or more clusters of corresponding peaks in the plurality of frequency domain signals.

18. The apparatus of claim 17, wherein the processing electronics are configured to, for each cluster of corresponding peaks:

determine a prominence metric comprising a sum of prominences of the peaks in the cluster;

determine a variance metric comprising a sum of absolute values of frequency difference for each peak in the cluster from a center frequency of the cluster; and, determine a ratio of the prominence metric to the variance metric, wherein the ratio of the prominence metric to the variance metric is used to determine a confidence score for a thickness determined based on that cluster of corresponding peaks.

* * * * *